United States Patent [19]
McKee et al.

[11] Patent Number: 6,034,465
[45] Date of Patent: Mar. 7, 2000

[54] PUMP DRIVEN BY BRUSHLESS MOTOR

[75] Inventors: Gary F. McKee, Newport Beach; Mike Saveliev, Huntington Beach; David J. Cooper, Tustin Ranch, all of Calif.

[73] Assignee: Shurfle Pump Manufacturing Co., Santa Ann, Calif.

[21] Appl. No.: 09/126,400

[22] Filed: Jul. 30, 1998

Related U.S. Application Data
[60] Provisional application No. 60/054,972, Aug. 6, 1997.

[51] Int. Cl.$^7$ ...................................................... H02K 1/22
[52] U.S. Cl. .......................... 310/268; 310/156; 310/63; 417/352; 417/406
[58] Field of Search ..................................... 310/268, 156, 310/68 R, 43, 63; 417/356, 423.7, 352, 353, 406; 361/704, 719, 720

[56] References Cited

U.S. PATENT DOCUMENTS

| 3,433,163 | 3/1969 | Sheets et al. | 417/353 |
| 3,597,117 | 8/1971 | Zoehfeld | 417/354 |
| 3,618,337 | 11/1971 | Mount | 62/505 |
| 3,767,330 | 10/1973 | Signorile | 417/420 |
| 3,831,062 | 8/1974 | Haug et al. | 361/710 |

(List continued on next page.)

FOREIGN PATENT DOCUMENTS

| 0401761 | 12/1990 | European Pat. Off. . |
| 0719938 | 7/1996 | European Pat. Off. . |
| 2267650 | of 0000 | France . |
| 19622286 | 11/1996 | Germany . |
| 19646617 | 5/1998 | Germany . |
| 19622286 | 11/1998 | Germany . |
| 61-010930 | 6/1984 | Japan . |
| 61-150628 | 7/1986 | Japan . |
| 2307947 | 6/1997 | United Kingdom . |
| 880219 | 3/1988 | WIPO . |

OTHER PUBLICATIONS

Krause et al, "A Pressed Soft Magnetic Material for Motor Applications", Jun. 1996.
Jansson et al, Powdered Soft Magnetic Materials for Medium Frequency Applications, Feb. 1996.
Platt, IEEE Transactions on Magnetics, vol. 25, No. 4, pp. 3076–3078, Jul. 1989.
Tengzelius et al, The International Journal of Powder Metallurgy, vol. 32, No. 3, pp. 203–205, 1996.
Zhang et al, "Analysis and Experimental Validation of Performance for an Axial Flux Brushless Permanent . . . ".
Hoganas AB Advertisement.
Magnews, s/ Hoganas advertisement, Winter–1995.
Prof. A.G. Jack, The UK Magnetic Society, Feb. 14, 1996.

Primary Examiner—Nestor Ramirez
Assistant Examiner—Joseph Waks
Attorney, Agent, or Firm—Stout, Uxa, Buyan & Mullins; Frank J. Uxa

[57] ABSTRACT

A pump including a pump casing having an inlet and an outlet, and an impeller having a rotary axis and being rotatably mounted within the pump casing for rotation about the rotary axis is provided. The impeller is configured and positioned relative to the pump casing so that the rotation of the impeller is effective to urge fluid from the inlet to flow through the outlet. A rotor assembly, coupled to and rotatable with the impeller, is provided with a plurality of permanent magnetic poles which are arranged in a generally flat array. A stator assembly is spaced apart from and generally facing the generally flat array of magnetic poles and includes a stator and a plurality of magnetic windings positioned and adapted to effect rotation of the rotor and the impeller upon energization thereof. A bulkhead is positioned between the rotor and the stator. The bulkhead includes a centrally located mounting feature. A stationary axle is located partially in and supported by the mounting feature and extends outwardly across the bulkhead. A bearing is rotatably mounted on the axle and is adapted to rotate with the rotor assembly and the impeller. A heatsink member is provided and is effective to conductively remove heat generated by the stator assembly and electronic controls.

39 Claims, 9 Drawing Sheets

U.S. PATENT DOCUMENTS

| | | | |
|---|---|---|---|
| 3,867,655 | 2/1975 | Stengel et al. | 310/66 |
| 3,922,574 | 11/1975 | Whiteley | 310/156 |
| 3,932,069 | 1/1976 | Giardini et al. | 417/420 |
| 3,974,406 | 8/1976 | Wehde | 310/67 R |
| 4,020,372 | 4/1977 | Whiteley | 310/61 |
| 4,242,039 | 12/1980 | Villard et al. | 415/112 |
| 4,311,937 | 1/1982 | Clark | 310/268 |
| 4,315,359 | 2/1982 | Gray | 29/898.02 |
| 4,360,751 | 11/1982 | Arnold, Jr. et al. | 310/60 R |
| 4,380,355 | 4/1983 | Beardmore | 384/123 |
| 4,400,858 | 8/1983 | Goiffon et al. | 24/546 |
| 4,410,285 | 10/1983 | Strasser et al. | 384/278 |
| 4,428,719 | 1/1984 | Hayashibara et al. | 417/354 |
| 4,482,302 | 11/1984 | Grignon | 417/354 |
| 4,508,567 | 4/1985 | Mizuno et al. | 73/231 |
| 4,575,264 | 3/1986 | Mizobuchi et al. | 384/369 |
| 4,605,874 | 8/1986 | Whiteley | 360/62 |
| 4,618,806 | 10/1986 | Grouse | 318/254 |
| 4,655,681 | 4/1987 | Mori et al. | 415/100 |
| 4,664,592 | 5/1987 | Grzina | 384/369 |
| 4,699,525 | 10/1987 | Mizobuchi et al. | 384/369 |
| 4,719,377 | 1/1988 | Horie et al. | 310/44 |
| 4,806,080 | 2/1989 | Mizobuchi et al. | 417/353 |
| 4,924,125 | 5/1990 | Clark | 310/67 R |
| 5,135,363 | 8/1992 | Harmsen et al. | 417/354 |
| 5,220,231 | 6/1993 | Veronesi et al. | 310/90 |
| 5,269,663 | 12/1993 | Cuniberti | 417/356 |
| 5,289,066 | 2/1994 | Clark | 310/67 R |
| 5,332,374 | 7/1994 | Kricker et al. | 417/420 |
| 5,356,272 | 10/1994 | Nagata et al. | 360/137 |
| 5,370,509 | 12/1994 | Golding et al. | 417/423.1 |
| 5,399,074 | 3/1995 | Nose et al. | 417/423.1 |
| 5,407,331 | 4/1995 | Atsumi | 417/420 |
| 5,443,503 | 8/1995 | Yamane | 623/3 |
| 5,594,186 | 1/1997 | Krause et al. | 75/228 |
| 5,656,880 | 8/1997 | Clark | 310/268 |
| 5,686,769 | 11/1997 | Stephany et al. | 310/64 |
| 5,769,069 | 6/1998 | Caffell | 126/634 |

PUMP DRIVEN BY BRUSHLESS MOTOR

This application claims the benefit of Provisional Application Ser. No. 60/054,972, filed Aug. 6, 1997, which is expressly incorporated herein by reference.

BACKGROUND OF THE INVENTION

The present invention relates to pumps driven by brushless electric motors. More particularly, the invention relates to impeller pumps driven by generally flat structured, brushless electric motors.

Brushless electric motors have been suggested and/or used for various purposes. In general, such motors come in at least two configurations; a drum style motor in which the rotor and stator of the motor have generally cylindrical shapes; and a flat style motor in which the rotor and stator of the motor are present as generally flat discs. Although the drum style motors are often capable of generating more power, the flat style motors have the advantage of being compact in size.

Flat style brushless electric motors have been suggested for use with impeller pumps. See, for example, Mizobuchi et al U.S. Pat. No. 4,806,080; Kricker et al U.S. Pat. No. 5,332,374; and Atsumi U.S. Pat. No. 5,407,331. There continues to be a need to provide new impeller pumps driven by flat style brushless electric pumps, in particular for pumping liquids, such as water and the like.

SUMMARY OF THE INVENTION

New pumps, preferably liquid handling pumps, driven by flat style brushless electric motors have been discovered. The present pumps take advantage of the small or compact size of such motors. In fact, the present pumps include impellers designed to work in close proximity to and in cooperation with such motors so that the entire pump, including motor and impeller, is of compact size. Importantly, the present pumps include one or more features which advantageous increase the effective power of the pumps without increasing size. In addition, features which reduce friction and/or dissipate heat generated by the pumps are included. Moreover, the present pumps preferably are constructed of a reduced number of parts, thus making manufacture relatively easy, and enhancing the reliability and effective life of the pumps. In short, the present pumps provide one or more advantages which are important in terms of performance and cost effectiveness.

In general, the present pumps comprise a pump casing or housing, which may include a plurality of housing components fastened together; an impeller; a rotor; and a stator. The impeller has a rotary axis and is rotatably mounted within the pump housing for rotation about the rotary axis. The impeller provides the pumping action to the fluid passing into the pump casing through the inlet. In other words, the impeller is configured and positioned relative to or within the pump casing so that the rotation of the impeller about the rotary axis is effective to urge fluid from the inlet to flow through the outlet.

The rotor is coupled to and rotatable with the impeller and includes a plurality of permanent magnetic poles arranged in a generally flat array. The rotor preferably has an integral structure. For example, the integral rotor can include a magnet and a so-called backiron and is encapsulated in polymeric material. The stator is spaced apart from and generally facing the array of permanent magnetic poles on the rotor. In a preferred embodiment, the stator comprises a mass of metal particles, more preferably pressed metal particles. A plurality of magnetic windings are positioned on the stator and are adapted to effect rotation of the rotor and impeller upon energization of the windings. Electrically insulating material preferably is located between the stator and the magnetic windings. Such insulating material or member(s) provides electrical insulation between the current carrying windings and the stator. Such insulating material or member(s) preferably provides parallel surfaces and retaining features to support the windings during the process of assembling the stator/windings combination.

In a very useful embodiment, it has been found that controlling the relative sizes of the magnetic area of the rotor and of the impeller is effective in controlling the amount of useful power provided to the impeller. In particular, very useful and effective amounts of power, for example, for pumping liquids, are provided to the impeller when the rotor is sized to have a maximum magnetic cross-sectional area perpendicular to the rotary axis which is larger than, more preferably at least about 125% and still more preferably at least about 150%, the maximum cross-sectional area of the impeller perpendicular to the rotary axis.

Without wishing to limit the present invention to any particular theory of operation, it is believed that an impeller having a reduced cross-sectional area perpendicular to the rotary axis relative to the rotor provides reduced mass and/or volume which needs to the rotated. Put another way, the relatively large rotor, together with the stator and other components of the present pump, generates increased power to more effectively rotate the relatively small impeller to pump fluid, in particular liquid, through the outlet of the pump. In any event, for a given size, e.g., diameter, of pump, it is preferred that the maximum magnetic crosssectional area, and more preferably the maximum diameter, of the rotor perpendicular to the rotary axis of the impeller be larger than the maximum cross-sectional area, and more preferably the maximum diameter, of the impeller perpendicular to its rotary axis.

A particularly useful embodiment of the present pumps is directed to rotors including ring magnets, which preferably have integral structures. Such ring magnets, which include the plurality of permanent magnetic poles arranged in a generally flat array, are very performance effective in the present pumps and, in addition, are cost effective. The rotor preferably is encapsulated in polymeric material, thereby advantageously reducing the number of separate components needed during final pump assembly. In addition, the encapsulation or so-called "overmolding" of the rotor provides corrosion protection to the magnet and separate backiron, if present. In addition, the encapsulation preferably provides one or more retention features for the coupling, e.g., snapfit coupling, of the impeller to the rotor. The magnet, for example, a ring magnet, of the rotor may have a substantially uniform composition, that is a substantially uniform chemical composition. The permanent magnetic poles present in the magnet can be produced in any suitable manner, for example, by magnetizing a ring magnet, as desired, after the ring magnet structure (unmagnetized) is formed.

If desired, the rotor can be configured so that a finite space is present between adjacent permanent magnetic poles. Generally, the permanent magnetic poles are arranged so that alternating north (N) and south (S) poles are provided. This is most conveniently accomplished by placing the generally flat array of permanent magnetic poles in a substantially circular pattern so that each magnetic pole in this pattern is situated adjacent two magnetic poles of the opposite charge.

The rotor preferably further includes a region extending away from the stator which has the magnetic properties of iron or other soft magnetic material. This so called "back-iron" region enhances the amount of power that is generated by the interaction of the rotor and stator of a given size. The "backiron" region can be included as a separate layer adjacent the back side, that is the side away from the stator, of the magnet, for example, by adhering the "backiron" to the magnet. Alternately, the "backiron" region or regions of the rotor may be unitary with the magnet, for example, a ring magnet, and may have substantially the same composition as the magnet. The magnetic properties of the "backiron" region can very effectively be imparted to the magnet after the unmagnetized magnet is produced. A specific example of a ring magnet useful in the present invention is a magnet made of strontium ferrite, for example, embedded in a polymeric material or a ceramic material which is shaped in the form of an annular ring.

In one useful embodiment, the rotor and impeller are an integral structure. This feature reduces the parts count needed to produce the present pumps and, in addition, enhances the reliability and increases the effective life of the pumps since the rotor and impeller cannot be separated. Alternatively, the rotor, for example, encapsulated in polymeric material, is adapted to provide for effective coupling and decoupling of the impeller. Such an embodiment allows the replacement of a worn or damaged impeller without having to also replace the rotor.

In one embodiment, the present pumps include a bulkhead sheet or membrane fastened to the pump casing or housing and positioned between the rotor and stator. This bulkhead preferably includes one or more regions in contact with and structurally supported by the stator. Additional support for the bulkhead is provided by a bulkhead support member, which also preferably provides an anchoring for a central fastener, e.g., bolt, to maintain the housing structurally intact. This structural support of the bulkhead is an important preferred feature of the present invention. By providing such structural support, the bulkhead can be produced so as to result in reduced interference in the flux line paths between the stator windings and the rotor while, at the same time, acting as an effective stationary seal against fluid from the rotor side of the pump passing into the stator side of the pump. Further, the abutting bulkhead and stator surfaces provide a conductive path for the transfer of heat (stator and winding losses) into the pumped fluid, thereby cooling the stator assembly.

The bulkhead preferably is made of a material having a low magnetic permeability and a high coefficient of thermal conductivity. The low magnetic permeability reduces interference with the flux lines as they move between stator and rotor, for example, to reduce or even minimize diversion of the magnetic flux in directions other than straight across the air gap between the stator and the rotor. The high coefficient of thermal conductivity of the bulkhead is effective in dissipating heat produced at the stator and by the rotation of the rotor and impeller. The bulkhead preferably has a reduced thickness, for example, on the order of about 0.001 inches or about 0.005 inches to about 0.1 inches or about 0.5 inches thick, sufficient to maintain structural integrity. Such reduced thickness is advantageous in reducing the detrimental effects of eddy currents in the electrically conductive bulkhead and, in addition, allows for a smaller effective air gap between the stator and the rotor.

The region or regions of the bulkhead which are structurally supported by the stator are preferably located directly between the rotor and the stator. Again, it is important that the bulkhead not substantially interfere with the passage of flux lines between the stator and rotor.

The bulkhead preferably includes a centrally located mounting fixture, for example, a socket or a boss. In this embodiment, the present pumps preferably further include a stationary axle, preferably of tubular configuration, partially located in or on, and preferably supported by, this mounting feature and extending outwardly across the bulkhead. The axle, in one embodiment, is coupled to the pump casing and/or is keyed to assist in preventing the rotation of the axle. A bearing is advantageously provided, is rotatably mounted on the axle and is adapted to rotate with the rotor and the impeller.

A stationary thrust bearing preferably is included adjacent the bearing and is located in or on the mounting feature defined by the bulkhead.

In the embodiment in which the pump includes a stationary axle and bearing, a fluid passageway preferably is present which provides fluid communication between the inlet of the pump and an inner surface of the bearing facing the axle. The bearing preferably includes at least one fluid pathway between the inner surface of the bearing and the axle. Such fluid passageway and fluid pathway provide fluid into or between the bearing and the axle to dissipate heat and reduce rotational friction. This, in turn, enhances the efficiency of the pump.

In one particularly useful embodiment, at least a portion of the space between the rotor and the stator extending away from the bearing is part of the fluid passageway. This allows the fluid to flow in the space between the rotor and the stator, on a continuous basis, which facilitates dissipation of heat. The pump may include a plurality of radially extending vanes which are rotatable with the rotor and impeller and are positioned to urge fluid to flow in the fluid passageway.

The use of fluid from the inlet to dissipate heat and reduce friction between the bearing and the axle and to dissipate heat generated by the stator and the rotor and impeller is one very useful feature of the present invention. This is accomplished without causing the stator to be subjected to the fluid and without having any moving or rotating seal between the stator and the rotor. The use of a static seal increases the effective life of the present pumps.

In a particularly useful embodiment, the stator support member is provided which carries the mass of the stator assembly, that is the stator, insulating material or member(s) and windings. The stator support member is situated so as to transfer the mass of the stator assembly to the bulkhead support, thereby effectively supporting the stator assembly and maintaining the position of the stator relative to the bulkhead.

In another aspect of the present invention, the present pumps include a housing coupled to the pump casing. This housing has an inner sidewall and defines a space in which the stator is located. A heatsink member is located in this space defined by the housing and includes a first element which extends across at least a portion of the space. A second element is provided and is coupled to the first element. The second element is in contact with the inner sidewall of the housing. The heatsink member is configured to be effective in dissipating heat from the stator assembly and the electronics used in controlling the operation of the pump through the housing. Such heat dissipation facilitates increased pump efficiency.

The first element preferably includes substantially opposing first and second ends. The second element is coupled to the first element at the first end. The heatsink member preferably further comprises a third member coupled to the first element at the second end of the first element. This third element is in contact with the inner sidewall of the housing.

The present pump preferably includes an electronics assembly coupled to the plurality of magnetic windings. This electronics assembly is effective in controlling the operation of the pump. At least a portion of the electronics assembly is secured to the first element of the heatsink member. This first element preferably includes tab or clip features, more preferably integral with the heatsink member, which provide sufficient clamping force to maintain contact between the electronic assembly, for example, power transistors and the like, and the heatsink member. Maintaining such contact between the heat sources of the electronics assembly and the heatsink member enhances the ability of the heatsink member to dissipate heat produced during the operation of the pump through the housing.

The heatsink member contacts the inner sidewall of the housing along one or two large areas, for example, areas defined by the contact between the second and third elements of the heatsink member and the inner sidewall of the housing. Such large contact area or areas provide for substantial thermal conduction between the heatsink member and the housing, which enhances heat dissipation from the pump. The second element and the third element of the heatsink member preferably each defines an inner and outer wall. A major amount, that is at least about 50%, of the outer wall is in contact with the inner sidewall of the housing.

The second element, and preferably the third element, of the heatsink member is sized and sufficiently resilient to effectively bias the element or elements for contact with the inner sidewall of the housing.

The heatsink member preferably is made of a material having a thermal conductivity equal to or greater than the thermal conductivity of aluminum. In a particularly useful embodiment, the heatsink member is made of a metal or combination of metals.

Each of the features disclosed herein is included within the scope of the present invention. In addition, all combinations of two or more of the presently disclosed features which are not mutually inconsistent or incompatible are also included within the scope of the present invention.

These and other aspects and advantages of the present invention are apparent in the following detailed description and claims, particularly when considered in conjunction with the accompanying drawings in which like parts bear like reference numerals.

DETAILED DESCRIPTION OF THE PREFERRED EMBODIMENT

Figures 1, 2, 3, 4:
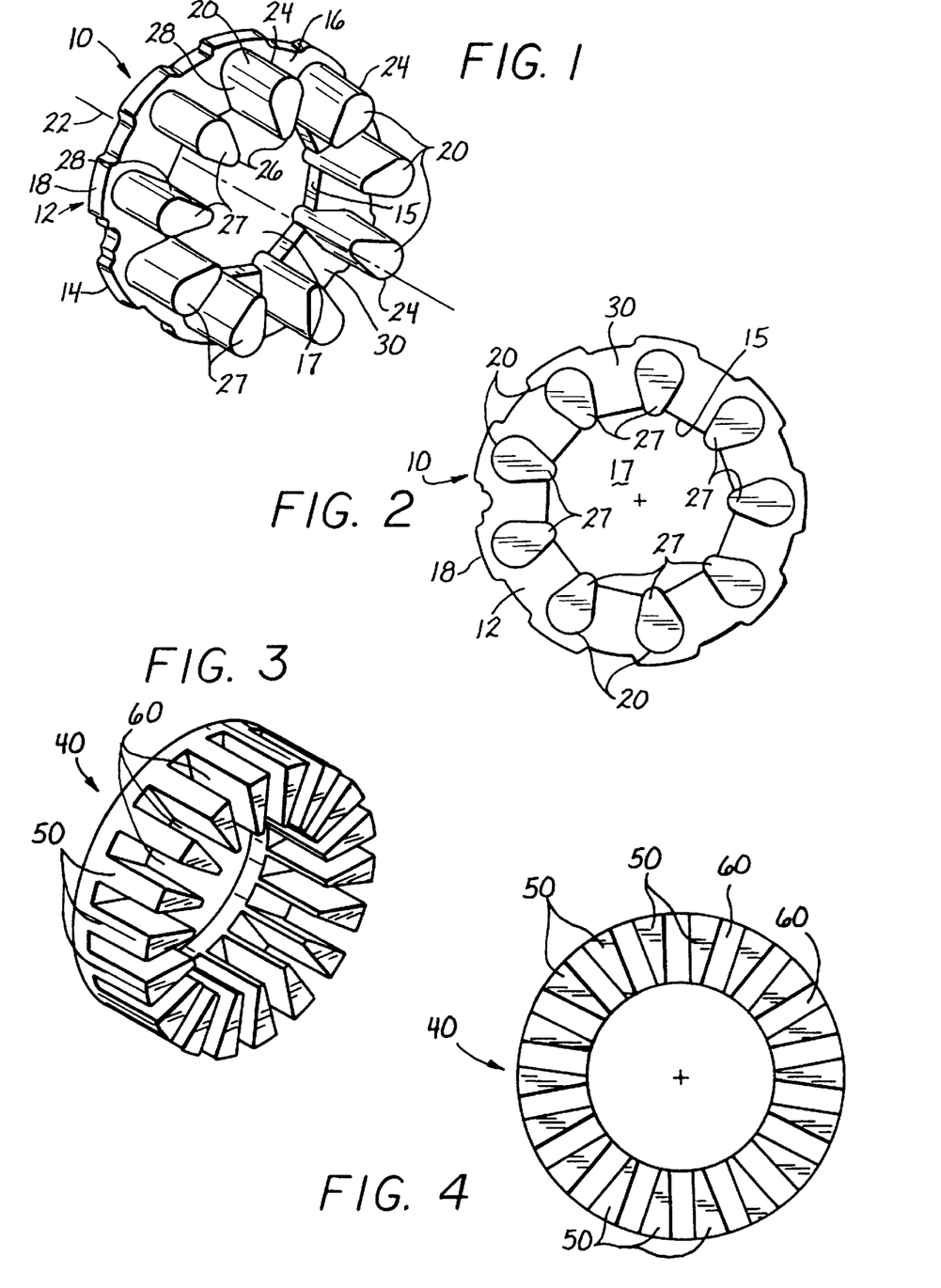
FIG. 1 is a perspective drawing of a stator in accordance with the present invention.
FIG. 2 is a front plan view of the stator shown in FIG. 1.
FIG. 3 is a perspective drawing of an alternate embodiment of a stator in accordance with the present invention.
FIG. 4 is a front plan view of the stator shown in FIG. 3.

Referring now to the drawings, a stator, shown generally at 10, in accordance with the present invention includes a substantially flat plate 12 having a back surface 14, a substantially opposing front surface 16 and outer peripheral surface 18 therebetween. The plate 12 includes an inner peripheral surface 15 which defines a central opening 17. Extending from the substantially flat front surface 16 are a series of nine (9) projections which extend away from the front surface and radially inwardly from the peripheral surface and terminate prior to the central axis 22 of the stator 10.

Each of the projections 20 includes a outer peripheral surface 24, an inner peripheral surface 26, a forward extending surface 27 and two (2) equally sized side surfaces 28. The side surfaces 28 between adjacent projections 20, together with front surface 16, form a slot 30. Each of the slots 30 is equally sized and has a substantially constant dimension radially inwardly from the outer peripheral surface 24 to the inner peripheral surface 26 of the projections 20.

Figures 13A, 13B, 13C:
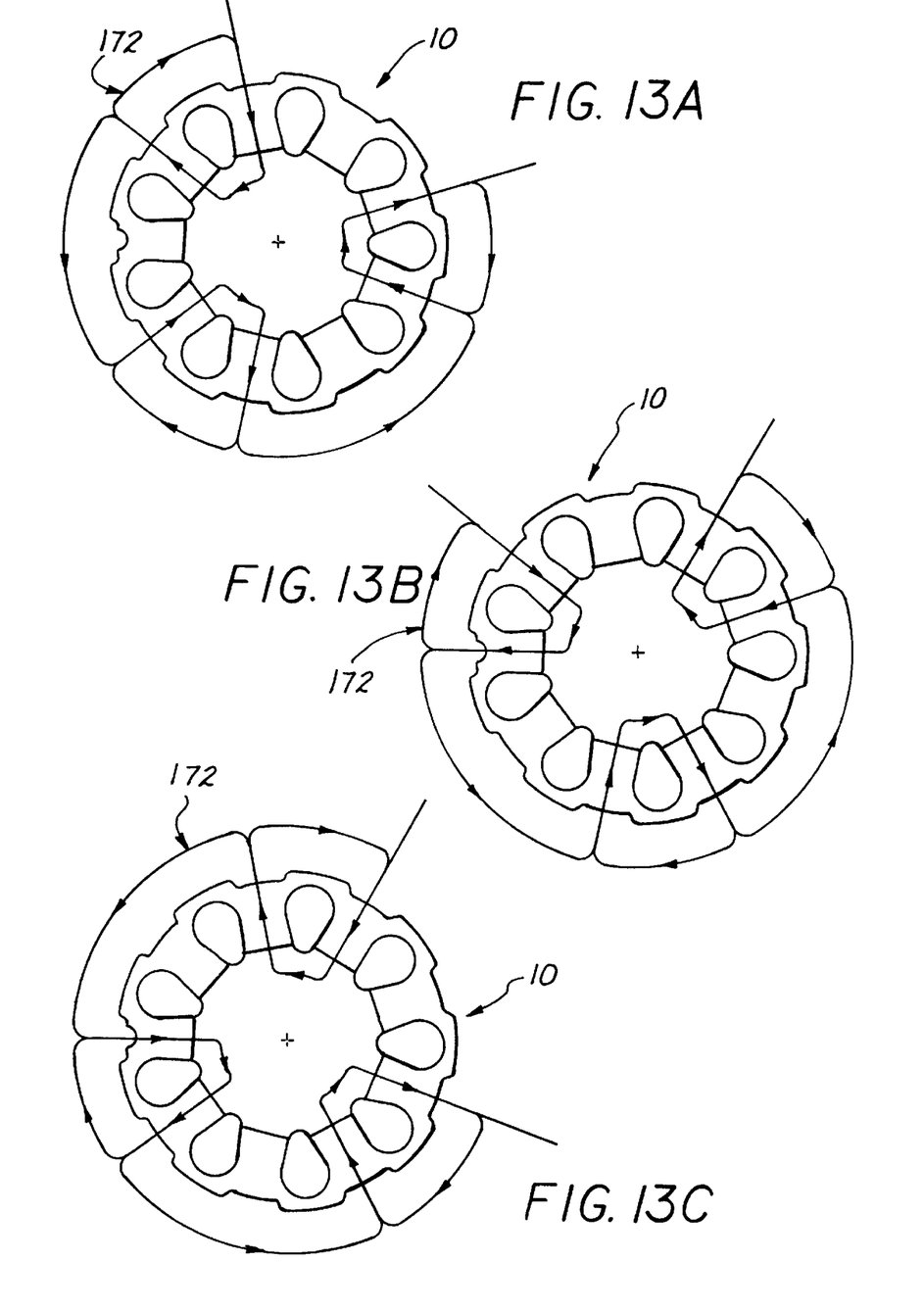
FIG. 13A, 13B and 13C are front plan views of the stator of the pump shown in FIG. 7 illustrating a windings pattern for a six (6) pole, three (3) phase motor.

Stator 10 is particularly effective for use in a three (3) phase direct current (DC) brushless electric motor. However, stators similar in composition to stator 10 can be employed in one (1), two (2) or more phase DC brushless electric motors. Electric windings are provided in the slots 30. As is discussed hereinafter, the windings are positioned on an electrical insulator which is located on the projections 20. One pattern for such windings is illustrated in FIGS. 13a, 13b and 13c. For the sake of clarity, the insulator is not shown and only one winding is shown in each of FIGS. 13a, 13b and 13c (and also in FIGS. 14a, 14b and 14c). However, a relatively large number of windings preferably are included in each of the slots 30, and the number of windings is chosen based on the desired power output of the motor.

The stator used in the present invention may be of any suitable structure and configuration provided that the stator functions as a stator. Any suitable material of construction or combination of materials of construction may be employed in the stator. In a preferred embodiment, the stator 10 is made from a mass of metal particles. Specifically, stator 10 is made from a mass of pressed metal particles. Such particles of metal, for example, metals having magnetic properties, i.e., metals which are attracted to magnets, such as iron, nickel, cobalt, other magnetic metals and the like, alloys, such as steel, iron and/or other metal or metals having magnetic properties alloyed with molybdenum, manganese, chromium, carbon, sulfur, silicone, copper, nickel, vanadium, niobium, gold, aluminum, phosphorus and the like and mixtures thereof, preferably are substantially linear, acicular particles having a substantially triangular configuration. Such a particle, shown generally at 34, is illustrated in FIG. 5.

Stator 10 may be, and preferably is, prepared in accordance with Krause et al U.S. Pat. No. 5,594,186, the disclosure of which is incorporated in its entirety herein by reference.

Figure 5:
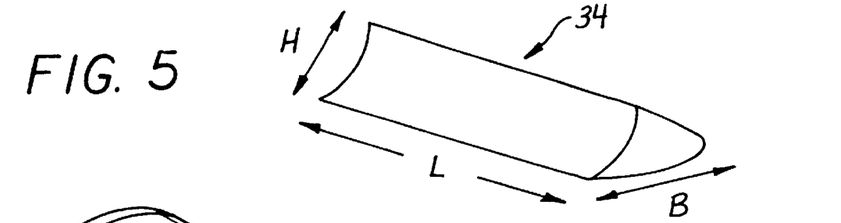
FIG. 5 is a perspective view of a metal particle used in forming the stators shown in FIGS. 1 to 4.

The metal particles 34 preferably have dimensions of about 0.002 to about 0.05 inches in height (H dimension in FIG. 5), about 0.002 to about 0.05 inches along the base (B dimension in FIG. 5) and about 0.006 to about 0.20 inches in length (L dimension in FIG. 5). The metal particles preferably have a substantially triangular cross-section and a die fill ratio of less than 3 to 1, with sufficient particle flow characteristics to permit the economic manufacture of the stator having a density of at least about 95%, and more preferably at least about 96%, of the theoretical density of a solid metal member.

It should be noted that the metal particles which may be used to produce the present stators can be of any suitable size, shape and configuration. Such particles preferably are of such configuration that a flat style motor, as described herein, including a stator made from a mass of such particles provides for increased power production and/or reduced detrimental eddy current effects relative to a similar motor in which the stator is made from a mass of solid metal rather than the mass of such particles. Also, the metal particles having a substantially triangular cross-section useful in the present invention are not limited to the embodiment shown in FIG. 5. Such metal particles can have longitudinal surfaces that are independently convex, concave and/or planar.

In addition, the present stators can be made in the form of a composite in which the mass of metal particles is combined, e.g., layered, mixed or otherwise composited, with one or more other materials, for example, polymeric materials, wood and the like and mixtures thereof. Such a composite stator should include a sufficient amount of the metal particles to function effectively as a stator and to provide at least one of the benefits or advantages described herein. Such composite stators can be produced using conventional composite production techniques, for example, mixing, layering, compressing, shaping, injection molding, etc.

The stator 10 of the present invention may be prepared by the traditional metal powder process comprising the steps of: (1) forming a metal particle mixture comprising the metal particles and a lubricant; (2) cold uniaxial pressing of the mixture to form a green compact having a high green density and good green strength; (3) heating the green compact at a sufficient temperature to pyrolyze the lubricant and form the metal stator; (4) optionally sintering the stator at a sufficient temperature for a sufficient time to impart additional strength to the stator and form a sintered stator; and (5) cooling the stator or sintered stator, then performing optional secondary operations on the stator to provide a finished metal component. Preferably, the method comprises a single cold, uniaxial pressing step, a single heating step, and a single sintering step, and provides a green compact and a stator having a density at least 95%, and preferably at least 96%, of the theoretical density, and a finished stator of essentially the identical size and shape of the green compact.

The lubricant used is typically an organic compound having a density of about 0.8 to about 1 g/cc (gram per cubic centimeter). In contrast, the powdered metal typically has a density of about 6 to about 8 g/cc. Accordingly, on a volume basis, even a small amount of lubricant by weight occupies an appreciable portion of the die volume. To achieve a high density, the volume occupied by lubricant preferably is minimized. Therefore, the lubricant preferably is present in an amount of about 0.015% to about 0.4% and more preferably about 0.015% to about 0.25%, by weight of the metal particle mixture.

The lubricant is an organic compound capable of being decomposed, or pyrolyzed, at the heating temperature. The pyrolysis products are gases which are expelled during heating. The lubricant may be a solid at room temperature and incorporated into the metal particle mixture in particulate form. Examples of lubricants include, but are not limited to, ethylene bis-stearamide, $C_{12}$ to $C_{20}$ fatty acids, for example, stearic acid and the like, paraffins, synthetic and/or natural waxes, polyethylene, fatty diesters, fatty diamides and the like and mixtures thereof. Salts of organic acids, like zinc, lithium, nickel, iron, copper, and/or magnesium stearate, also can be used as the lubricant. However, acid salt lubricants can leave a metal oxide by-product in the finished stator. The metal oxide by-product can adversely effect the stator.

For additional details regarding the production of stator 10 see the above-noted Krause et al patent.

FIGS. 3 and 4 show a substantially similar stator, shown generally at 40, which is substantially similar to stator 10. Components of stator 40 which correspond to components of stator 10 are identified by the same reference numeral increased by 30.

The primary difference between stator 40 and stator 10 is in the number, size and shape of projections 50 relative to projections 20. Specifically, stator 40 has eighteen (18) projections 50 as opposed to nine (9) projections 20. Each of the projections 50 is substantially smaller in size than the projections 20.

Figures 14A, 14B, 14C:
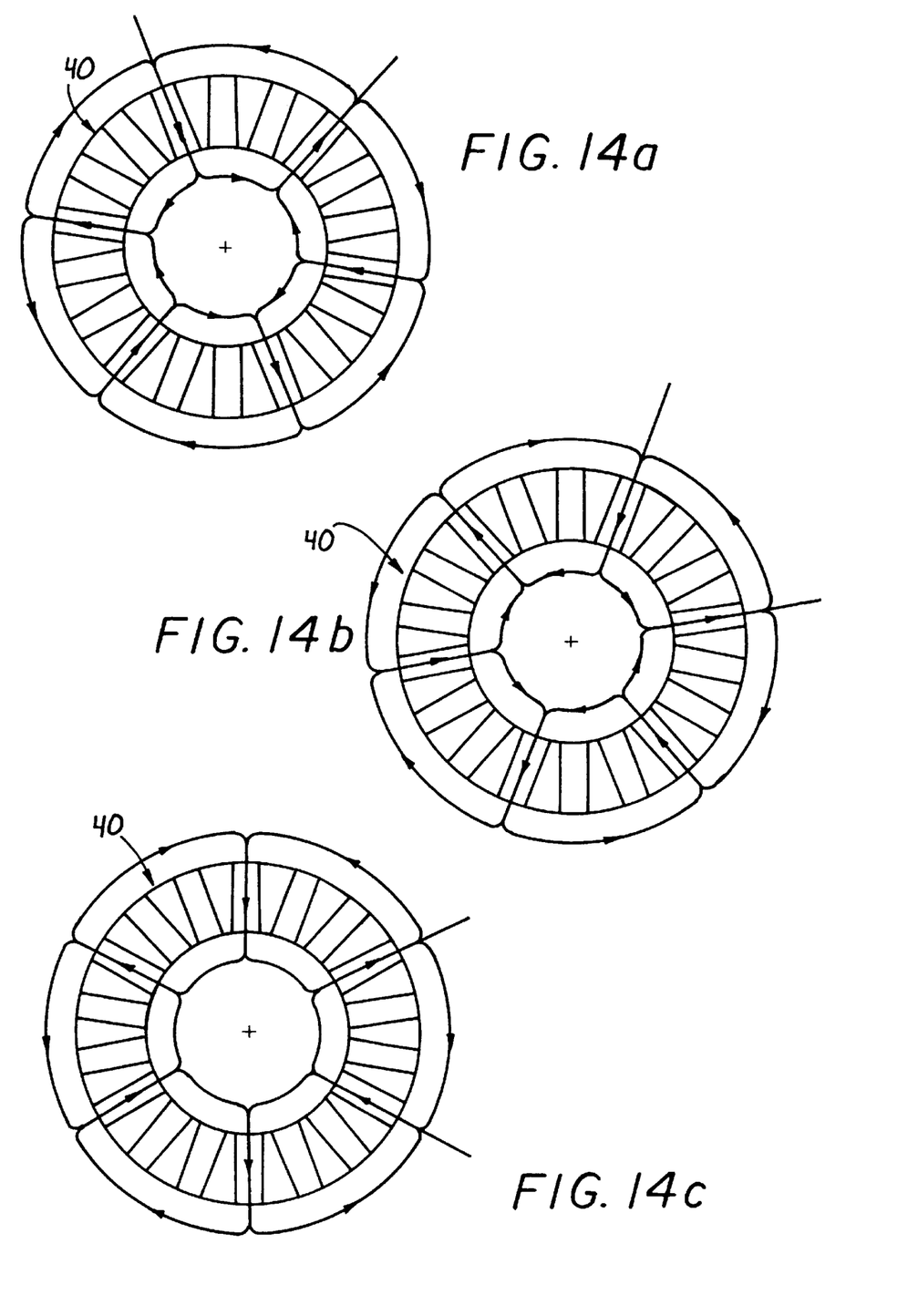
FIGS. 14A, 14B and 14C are front plan views of the stator shown in FIGS. 3 and 4 illustrating a windings pattern for a six (6) pole, three (3) phase motor.

Stator 40 can be employed in a three (3) phase electric motor in which electric windings are provided within the slots 60 of the stator, using a winding pattern as shown in FIGS. 14a, 14b and 14c. Of course, a stator structured similarly to stator 40 can be used in a one (1), two (2) or more phase DC brushless electric motor.

In the following description, the stator 10 is used. However, it should be noted that stator 40 can be similarly used with appropriate modifications to account for the differences between stator 10 and stator 40.

Figure 6:
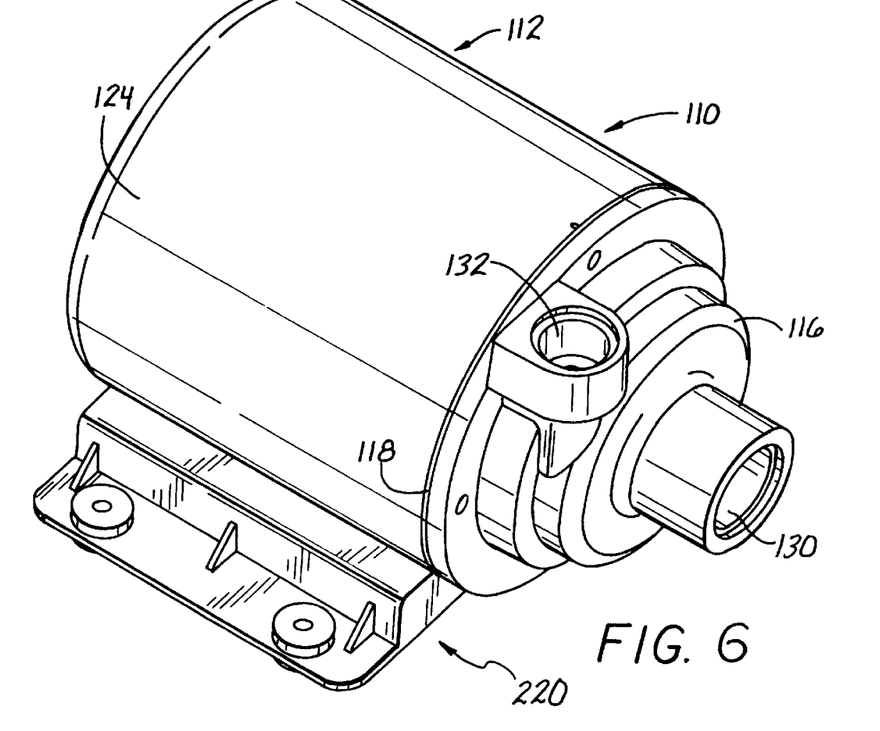
FIG. 6 is a perspective view of a fully assembled pump in accordance with the present invention.
Figure 7:
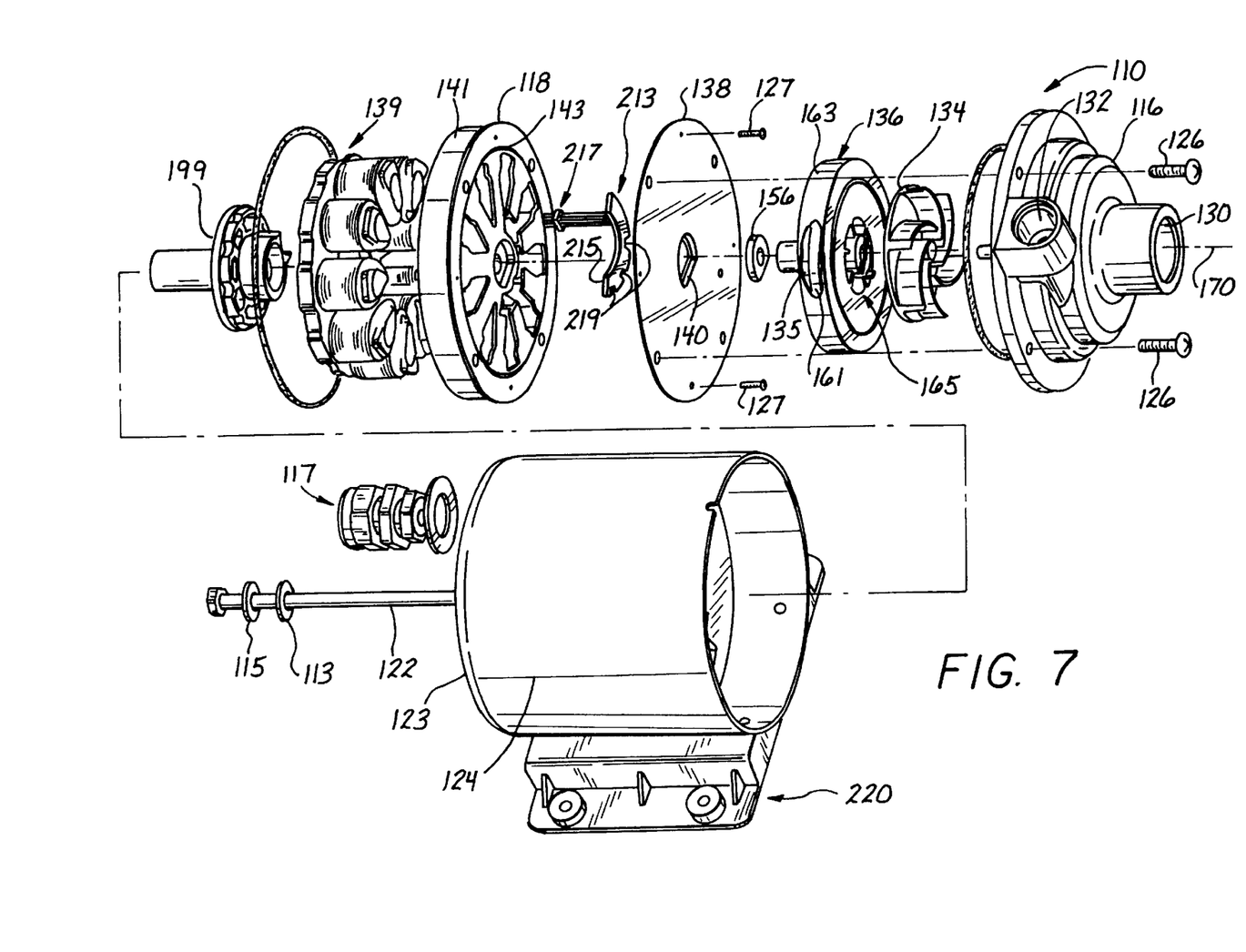
FIG. 7 is a perspective view of the pump shown in FIG. 6 with many of the parts exploded for illustrative clarity.

With reference to FIGS. 6 and 7, a pump, shown generally at 110, includes a housing 112 which is made up of a pump case 116, a bulkhead housing element 118, and a posterior housing 124. These housing components of pump 110 are fastened together using a plurality of conventional screw-type fasteners 126 which pass through at least two of the housing components. A center bolt 122 passes through the back side 123 of posterior housing 124 and is anchored in place to maintain the posterior housing secured to the remainder of the pump 110.

Figure 11:
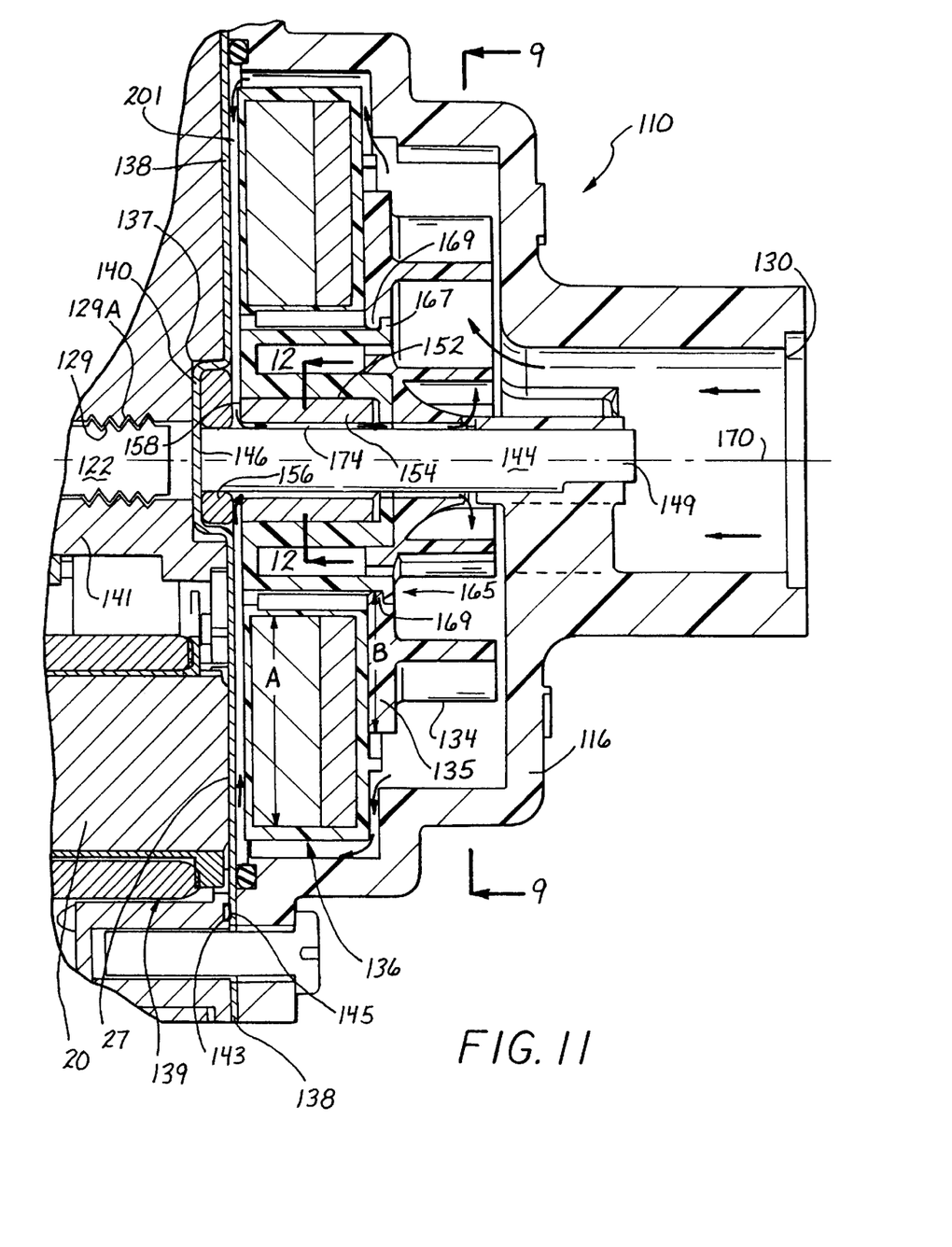
FIG. 11 is an enlarged partial cross-sectional view of the central area of the pump shown in FIG. 6.

Pump case 116 includes a liquid inlet 130, and a liquid outlet 132. An impeller 134, a rotor assembly 136 and a stator assembly 139 are positioned in the assembled pump 110, as shown in FIGS. 7 and 11. The bulkhead housing element 118 includes bulkhead support member 141, and carries a bulkhead sheet 138 which includes a centrally located mounting socket 140. Bulkhead support member 141 also includes a conforming socket 137 in which mounting socket 140 is positioned. The combination of bulkhead housing element 118 and bulkhead support member 141 is an integrally formed structure and includes a seal ridge 143 in which a bulkhead seal 145 (FIG. 11) is located. Bulkhead sheet 138 is secured to bulkhead housing element 118/bulkhead support member 141 using a plurality of relatively small screw-type fasteners 127. The combination of bulkhead housing element 118, bulkhead support element 141 and bulkhead seal 145 forms a static seal which prevents the stator assembly 139 from being exposed to the liquid being pumped. Posterior housing 124 houses stator assembly 139, the electronics which control the operation or activation of the stator assembly and heatsink member 147.

As shown in FIG. 11, the center bolt 122 includes a threaded surface 129 and bulkhead support member 141 includes a complimentary threaded surface 129A, which matingly engages surface 129 to anchor the center bolt in place. With reference to FIG. 7, center bolt 122 carries a seal ring 113 and a washer 115 which are positioned adjacent the back side 123 of posterior housing 124 when the center bolt is anchored in place. A conventional water proof strain relief assembly 117 is positioned against back side 123 to protect the electric power cord which delivers electric power to pump 110.

A stator support member 199 carries the mass of the stator assembly 139 and transfers it to the bulkhead support member 141. The bulkhead support member 141 provides support for the bulkhead sheet 138 and anchoring for the center bolt 122 to maintain the housing 12, and in particular the posterior housing 124, in place.

As shown in FIG. 11, centrally located socket 140 is configured to support stationary axle 144, which is of hollow or solid tubular construction, at end 146. The socket 140 (and conforming socket 137) and/or end 146 of axle 144 are keyed or include engaging flat surfaces which facilitate maintaining the axle stationary relative to the socket. Axle 144 extends beyond the bulkhead sheet 138 through a central opening 152 of rotor assembly 136 and through the impeller 134. End 149 of axle 144 is keyed and is positioned in pump case 116, which positioning assists in maintaining the axle stationary.

Rotor assembly 136 includes central opening 152 which is configured to allow both axle 144 and rotating bearing 154 to be received therein. In addition, a thrust bearing 156 is positioned in the socket 140 and is maintained stationary. This thrust bearing 156 faces the back surface 158 (FIG. 11) of bearing 154 which rotates with impeller 134 and rotor assembly 136 around axle 144. Thrust bearing 156 can be relatively small because the net thrust force is reduced since the axial force from the rotor assembly 136 opposes the force induced by pressure rise.

Figure 10:
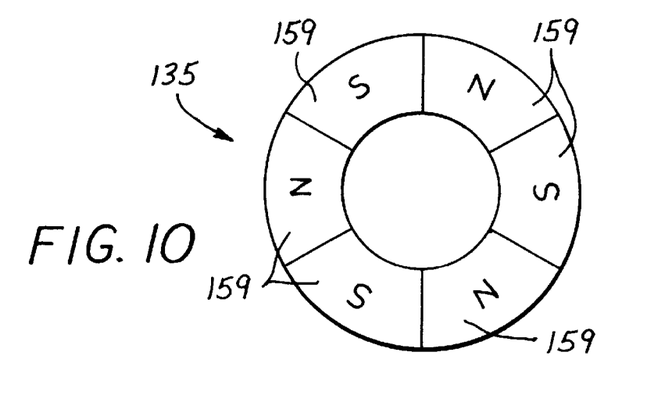
FIG. 10 is a front plan view of the rotor magnet of the pump shown in FIG. 7.

Rotor assembly 136 includes an annular magnet 137 including a series of six (6) alternating permanent magnetic poles 159, as shown in FIG. 10. Permanent magnetic poles 159, which are alternating north (N) and south (S) magnetic poles, are arranged in a circular array and are positioned to face the stator assembly 139. In addition, rotor assembly 136 includes an annular backiron element 161 secured, for example, adhered, to magnet 135 and extending away from stator assembly 139. Backiron element 161 has the magnetic properties of iron, and is substantially coextensive with the areas of permanent magnetic poles 159 perpendicular to the rotary axis 170 of pump 110. Backiron element 161 with the magnetic properties of a soft magnetic material, such as iron, enhances the interaction between the stator 10, in stator assembly 139, and magnet 135, in rotor assembly 136, thereby enhancing the ability of the rotor assembly and impeller 134 to be rotated in response to the magnetic windings 172 located in the stator assembly and enhancing power generation.

The rotor assembly 136 can be made of individual magnetic segments to provide the permanent magnetic poles and a separate layer (corresponding to backiron element 161) of iron located on the back side (away from stator assembly 139) to provide the magnetic properties of a soft magnetic material. One alternative is to use a ring magnet, to provide the plurality of permanent magnetic poles, together with a back layer or region of iron and the like having magnetic properties of a soft magnetic material. In another embodiment, rotor assembly 136 has an integral structure, for example, made of a composite of a thermoplastic polymeric matrix material, such as polypropylene and the like, and strontium ferrite and the like particles, which can be magnetized to provide both the alternating permanent magnetic poles 159 as well as an annular region extending away from the stator 10 which has the magnetic properties of a soft magnetic material.

In producing such a composite rotor assembly, the percentage of each constituent is adjusted in order to obtain the desired balance of magnetic and structural properties. The composite rotor may be formed by an injection molding process in which the mixed constituents is heated to be flowable and then forced into a closed cavity mold. While the mixed material is still in the mold, magnetizing apparatus, appropriately positioned relative to the mold, is energized, thereby aligning the magnetic particles within the mixed material.

The integrally structured rotor assembly described herein is an example of a ring magnet with the additional feature that a region of the structure is magnetized to have magnetic properties of a soft magnetic material. Having such an integral structure provides substantial benefits. For example, reduced weight is achieved which reduces pump wear and vibration. Also, the use of an integral rotor assembly reduces the number of parts included in the pump.

With a specific reference to FIGS. 7 and 11, the rotor assembly 136 shown includes a polymeric, for example, polyolefin, such as polypropylene and the like, overmold 163 which encapsulates the magnet 135 and backiron element 161. This overmolding 163 provides corrosion protection to the magnet 135 and backiron element 161. The overmold 163 also provides a central structure, shown generally at 165, located within the central hole of the rotor assembly 136. Central structure 165 forms the central opening 152 into which bearing 154 is placed. In addition, central structure 165 provides retention barbs 167 for the snap fit coupling of rotor assembly 136 and impeller 134.

Overmold 163 can be provided using various encapsulation techniques, many of which are well known and conventional in the art. Injection or insert molding may be employed to provide overmold 163. In general, the thickness of overmold 163 is greater on the face of the rotor assembly 136 extending away from the stator assembly 139. For example, the thickness of the overmold 163 at the face of the rotor assembly 136 facing the stator assembly 139 is on the order of about 0.001 inches to about 0.005 inches, for example, about 0.003 inches, while the thickness of the overmold on the face of the rotor assembly away from the stator assembly is on the order of about 0.002 inches to about 0.01 inches, for example, about 0.006 inches.

Impeller 134 includes a series of curved vanes 160 which are present in the primary liquid flow path between inlet 130 and outlet 132. Upon rotation of impeller 134, vanes 160 are effective to impart centrifugal energy to the liquid passing through inlet 130 which urges the liquid to flow under increased pressure through outlet 132. Thus, impeller 34 and vanes 160 provide the primary pumping action in pump 110.

As shown in FIG. 11, the impeller 134 includes a base plate 135 which is directly coupled to the rotor assembly 136. Specifically, impeller 134 includes a series of inwardly extending projections 169 which are adapted to be snapped in place under retention barbs 167 of central structure 165. Thus, impeller 134 rotates in direct response to the rotation of rotor assembly 136 with no coupling or power transfer assembly, such as a shaft, gear arrangement and the like, between these two components. This direct coupling feature reduces the size of pump 110 and the number of components required. In one embodiment, the impeller and rotor assembly are present as a single or unitary member. For example, a single part structured or configured to include both the impeller and rotor assembly, for example, made from the composite material described previously, can be formed using conventional techniques and performs very effectively in accordance with the present invention. Such a unitary impeller/rotor is shown in the drawings simply by considering the impeller 134 and rotor assembly 136 as a single part. The advantages provided by such a unitary impeller/rotor assembly include size reduction, reduced member of components and ease of assembly.

The maximum magnetic cross-sectional area of rotor assembly 136 perpendicular to rotary axis 170 of the pump 110 is larger than the maximum cross-sectional area of base plate 135 of impeller 134 perpendicular to the axis. As shown in Fir. 11 the line A identifies the plane of the maximum magnetic cross-sectional area of the rotor assembly 136 perpendicular to the rotary axis 170, while the line B identifies the plane of the maximum cross-sectional area of the base plate 135 of impeller 134 perpendicular to the rotary axis 170. The use of a relatively large rotor assembly 136 allows much shorter housing profiles, for example, relative to drum style brushless electric pumps. In addition, the relatively large rotor assembly 136 provides a larger area adjacent the bulkhead sheet 138 for dissipation of heat, for example, into the liquid from inlet 130 (as is described hereinafter), thereby reducing or even eliminating the need for bypass cooling passages. Further, the large rotor assembly 136 allows increased flexibility in the design of impeller 134 so as to reduce, or even substantially eliminate, wasted space and advantageously reduce the size of pump 110. Moreover, the large rotor assembly 136 relative to the impeller 134 provides increased power to the impeller while, at the same time, reducing the weight of the impeller relative to the rotor. Since relatively less weight is being rotated, the pump 110 performs more efficiently. In other words, more of the power that is generated by the interaction between the stator assembly 139 and the rotor assembly 136 is passed to the liquid being pumped through outlet 132.

Figure 8:
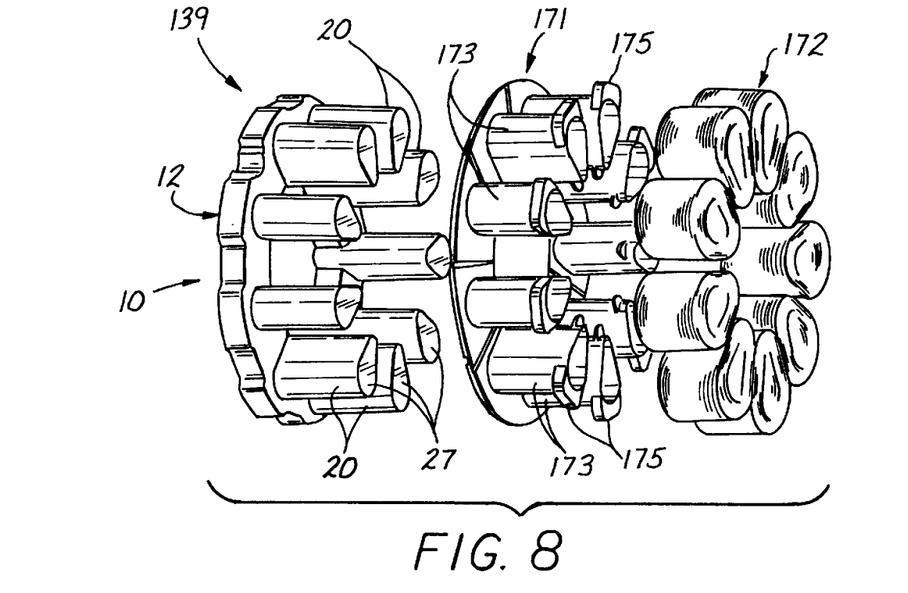
FIG. 8 is a perspective view of the stator assembly of the pump shown in FIG. 6 with the parts exploded for illustrative clarity.
Figure 9:
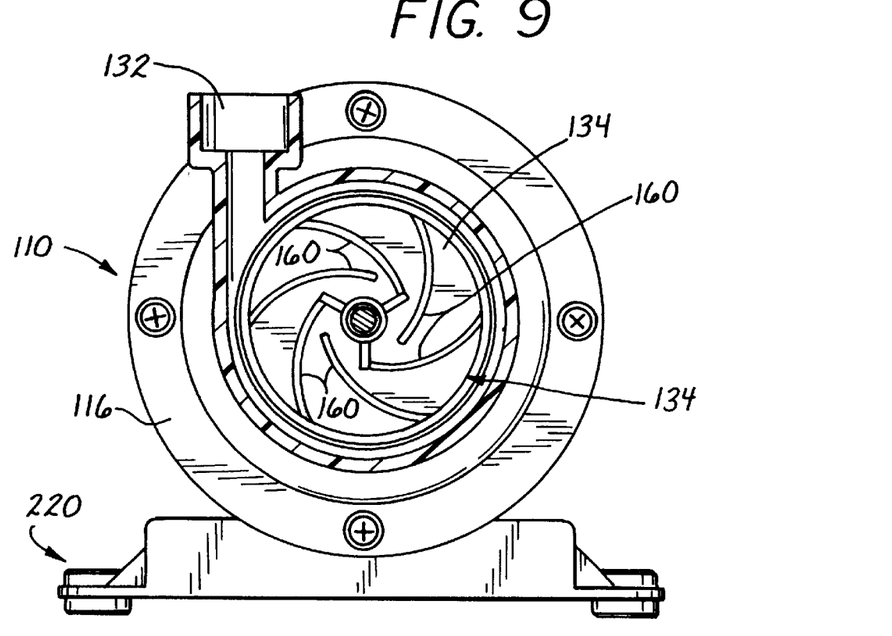
FIG. 9 is a cross-sectional view taken generally along line 9—9 of FIG. 11.

With specific reference to FIG. 8, the stator assembly 139 includes stator 10, insulating member 171 and windings 172. The stator 10 has been described in detail previously. The insulating member 171 is made of an electrically insulating material, for example an insulating ceramic or the like composition, and is effective to provide electrical insulation between the current caring windings 172 and the stator 10. In addition, the insulating member 171 provides hollow projections 173 into which the projections 20 of stator are placed. The hollow projections 173 include an outwardly extending retainer feature 175 which is very effective in supporting the winding 172 during the assembly, that is the winding, process. Although the insulating member 171 is shown as a single part, if desired, individual insulating elements can be employed for each of the projections 20 of stator 10.

The stator assembly 139 is positioned to interact with the rotor assembly 136 to effect rotation of the rotor assembly and the impeller 134 upon energization of the windings 172. The combination of the rotor assembly 136, stator assembly 139 and electronic controls in the posterior housing 124 forms a six (6) pole, three (3) phase brushless DC electric motor assembly. In this embodiment, the windings 172 of stator assembly 139 can be provided as illustrated in FIGS. 13a, 13b and 13c. Of course, the present invention is not limited to any specific number of permanent magnetic poles or to a motor of any particular phase or phases. The disc or flat arrangement of the present motors and pumps allows substantial flexibility in terms of size, number of permanent magnetic poles and motor configurations.

The electronic controls included within posterior housing 124 act to control the operation of the stator assembly 139 so as to provide the desired rotation of the rotor assembly 136 and impeller 134. These controls can be based on electronics which are conventional and well known in the art. In particular, electronic controls which are useful in operating brushless DC electric motors may be employed. Since such controls are conventional and well known in the art, a detailed description thereof is not presented here.

As shown in FIG. 7, a sensor module 213 is provided between the bulkhead sheet 138 and the bulkhead support member 141. This sensor module 213 includes a notched member 215 and a connector assembly 217. Each of the three (3) notches 219 of notched member 215 is adapted to receive and hold a Hall sensor. These Hall sensors are useful in controlling the operation of the motor assembly including stator assembly 139. Signals from the Hall sensors are passed through connector assembly 217 to a circuit board which is part of the control electronics located in the posterior housing 124.

The electronic controls and the stator assembly 139 do produce heat which can detrimentally affect the operation of the pump 110. The posterior housing 124 is made of a highly heat conductive material, for example, a metal such as aluminum, to facilitate the removal of heat produced heat from the electronic controls and the stator assembly 139 located within the posterior housing. In addition, the posterior housing 124 includes heatsink member 147 which is situated between the stator assembly 139 and the back side 123 of the posterior housing.

Figure 15:
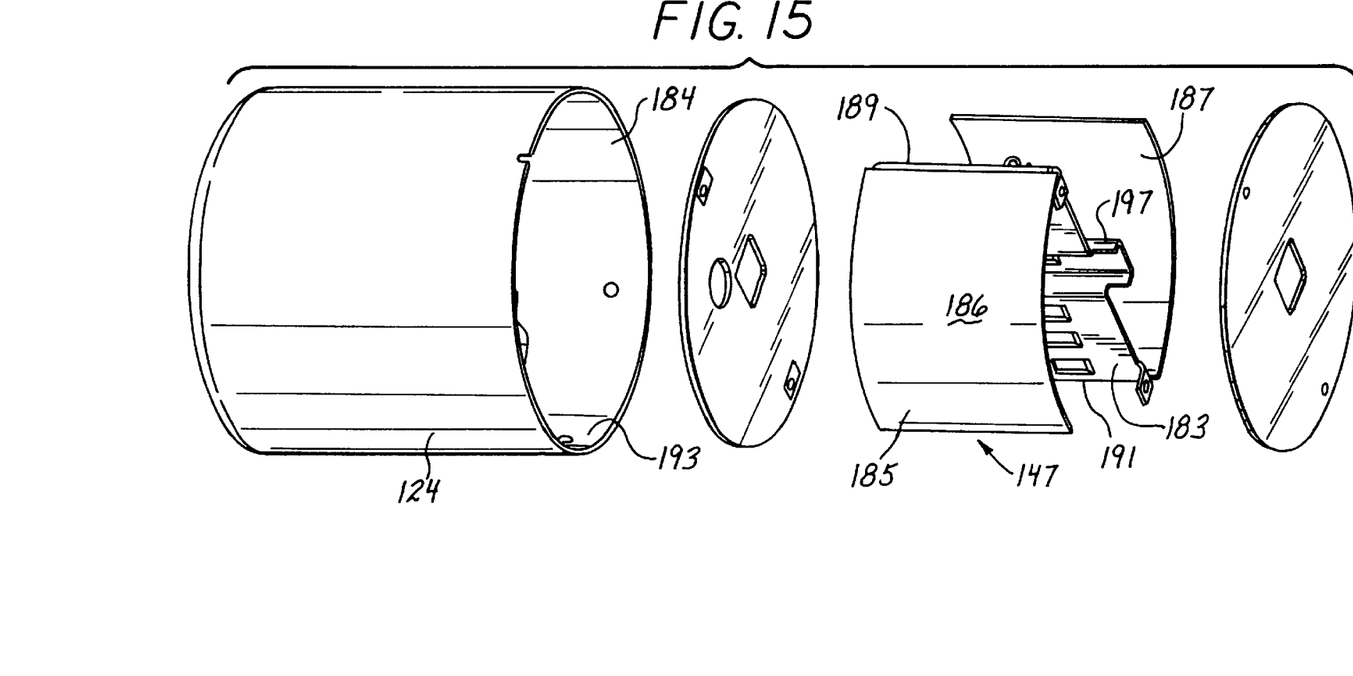
FIG. 15 is a perspective view of the housing section of the pump shown in FIG. 7 with the parts exploded for illustrative clarity.
Figure 16:
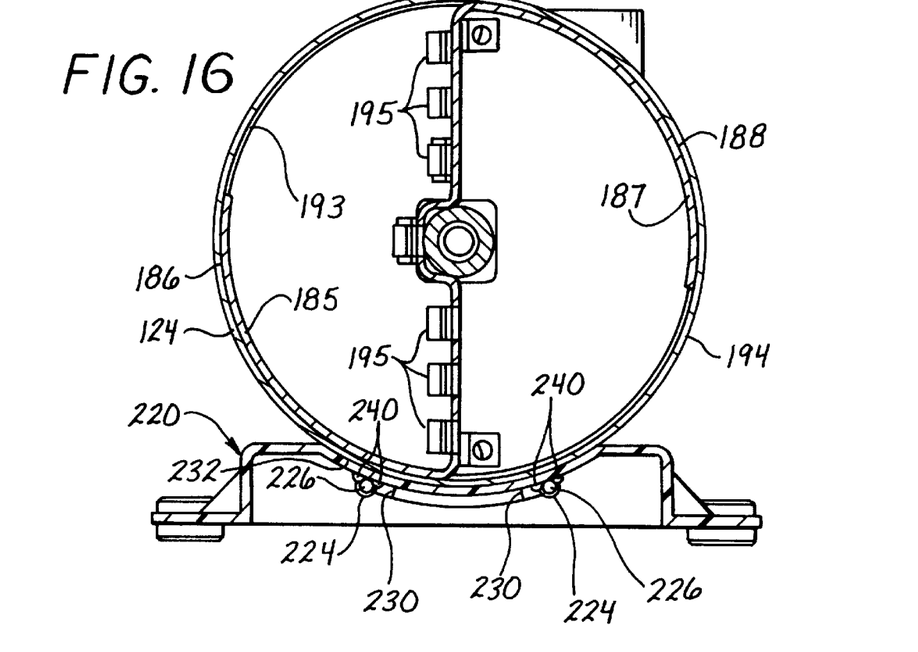
FIG. 16 is a cross-sectional view of the posterior housing of the pump shown in FIG. 6 illustrating the placement of the heatsink member and the attachment of the posterior housing to the baseplate.

With particular reference to FIGS. 15 and 16, heatsink member 147 includes a cross element 183 which extends substantially diametrically across the inner space 184 defined by posterior housing 124. In addition, heatsink member 147 includes a first curved element 185 and a second curved element 187. The first curved element 185 is joined to the cross element 183 at a first end 189, whereas the second curved element 187 is joined to the cross element at an opposing second end 191. As shown in FIG. 16, the curved elements 185 and 187 have sufficient resilience and are sufficiently sized so as to fit within the posterior housing 124 with relatively long contact areas between the outer surfaces 186 and 188 of the first and second curved elements 185 and 187, respectively, and the interior sidewall surface 193 of the posterior housing 124. In fact, substantially all of the outer surfaces 186 and 188 of first and second curved elements 185 and 187, respectively, are in contact with the interior sidewall surface 193 of posterior housing 124.

Further, the central element 183 includes a series of tabs or clips 195 which are adapted to provide a clamping force to maintain contact between the electronic control components which produce heat, for example, the power transistors, and the cross element 183. Further, the cross member 183 includes a forwardly extending projection 197 which comes in contact with the stator support member 199. In this manner, heat from the stator assembly 139 can be passed to the heatsink member 147 by conduction through stator support member 199.

The heat that is collected or transferred to heatsink member 147 is dissipated out of posterior housing 124 by conduction which occurs because of the large contact areas between first and second curved elements 185 and 187 and the posterior housing.

As shown in FIG. 11, the forward extending surfaces 27 of the projections 20 of stator 10 contact the bulkhead sheet 138 and provide a conductive path for the transfer of heat through the bulkhead sheet into the pumped liquid, as described hereinafter, thereby further cooling the stator assembly 139.

A further increase in efficiency is achieved by reducing the running friction of the pump 110. This is accomplished, at least in part, by using a portion of the liquid from inlet 130 to establish a fluid film between the rotating rotor assembly 136 and impeller 134 and the stationary frame, that is the bulkhead sheet 138, stator assembly 139 and associated components. This fluid film is provided as follows.

Figure 12:
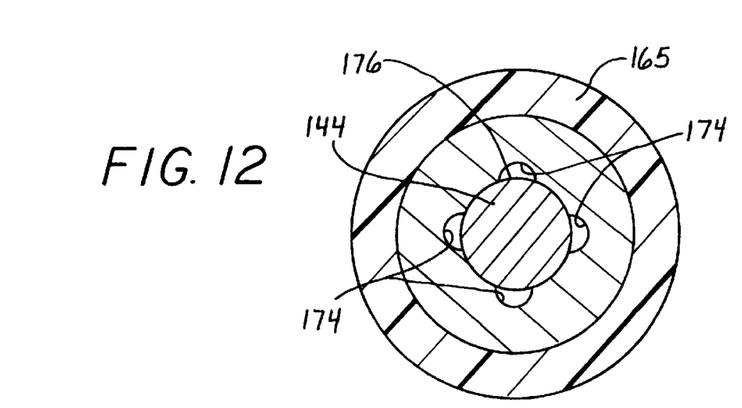
FIG. 12 is a cross-sectional view taken generally along line 12—12 of FIG. 11.

With particular reference to FIGS. 11 and 12, a portion of the liquid from inlet 130 passes into a fluid passageway 201 between bulkhead sheet 138 and rotor assembly 136. Bearing 154 includes a series of four (4) fluid pathways 174 which extend along the outer surface 176 of the axle 144 along the entire length of the bearing 154. These fluid pathways 174 receive fluid from the fluid passageway 201 between the bulkhead sheet 138 and the rotor assembly 136. The fluid pathways 174 empty through openings into the liquid passing into the pump through the inlet 130. This liquid in passageway 201 and pathways 174 forms a film which reduces friction between the rotating and non-rotating components of pump 110 and conducts heat caused by the rotation away from the site of the rotation, thereby facilitating more efficient operation of the pump. This liquid is in fluid communication with the outlet 132 so that a continuous flow of liquid is provided in the passageway 201 and the pathways 174.

Bulkhead housing element 118 and bulkhead sheet 138 provide a seal between the rotating portion, e.g., rotor assembly 136 and impeller 134, of pump 110 and the non-rotating or stationary portion, e.g., stator assembly 139, of the pump. Thus, no rotating member passes through the seal plate defined by bulkhead housing element 118 and bulkhead sheet 138. There are no moving parts within the stationary or electromagnetic portion, e.g. stator assembly 139, of the pump 110. All the moving parts have been integrated into the rotating portion of pump 110. This integrated rotor design feature reduces wear and tear on pump 110 and avoids exposing the stator assembly 139 to the liquid being pumped.

Bulkhead sheet 138 which is positioned, has a configuration and/or is made of material so as to provide one or more enhancements to pump 110. Thus, bulkhead sheet 138 is positioned between the rotor 136 and the stator assembly 139 and includes one or more regions, particularly regions which directly face the rotor assembly, which are in contact with and structurally supported by the stator 10. Allowing the stator 10 to structurally support at least a portion of the bulkhead sheet 138 reduces the size of pump 110, and allows the use of a relatively thin film or layer of material as the bulkhead sheet. For example, the region or regions of the bulkhead sheet 138 which are structurally supported by the stator 10 preferably are less than about 0.03 inches thick. Having the bulkhead sheet 138 very thin allows for increased interaction between the windings 172 on the stator 10 and the permanent magnetic poles 159 of the rotor assembly 136. This provides for increased efficiency in the interaction between the stator assembly 139 and rotor assembly 136 and increased power generation.

Moreover, the bulkhead sheet 138, particularly the regions of the bulkhead sheet which directly face the rotor assembly 136, are preferably made of a material having a low magnetic permeability, to further reduce the detrimental effects of eddy currents. The reduced magnetic permeability of bulkhead sheet 138 allows for increased interaction between the windings 172 on the stator 10 and the magnetic poles 159. The high coefficient of thermal conductivity allows for advantageously increased dissipation of heat and, ultimately, increased life of pump 110.

Because at least a portion of the bulkhead sheet 138 is structurally supported by the stator 10, a wide range of materials, satisfying both the reduced magnetic permeability and increased coefficient of thermal conductivity requirements, noted above, can be used in producing the bulkhead sheet. In other words, since the bulkhead sheet 138 is at least partially structurally supported by the stator 10, the strength of the material from which the bulkhead sheet is made is not a primary concern. Examples of useful materials for the bulkhead sheet 138 are brass, austenitic stainless steel, polymeric materials and the like.

Figure 17:
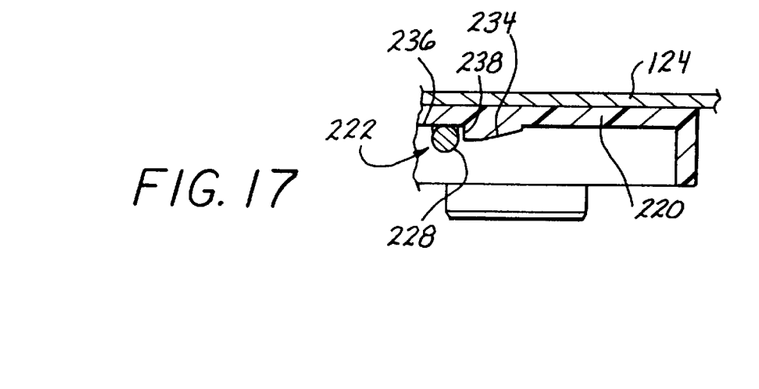
FIG. 17 is a view partly in cross-section showing further details of the attachment of the posterior housing to the baseplate.

With reference to FIGS. 16 and 17, baseplate 220 is shown attached to posterior housing 124 using clip member 222. In particular, a bracket including two loops 224 is secured, e.g., spot welded, to the exterior sidewall surface 194 of the posterior housing 124. Clip member 222 includes two elongated legs 226 joined by a crossbar 228. Baseplate 220 includes two spaced apart holes 230 positioned to allow loops 224 to extend therethrough when the concave surface 232 of the baseplate is placed in contact with the exterior sidewall surface 194 of the posterior housing 124, as shown in FIG. 16.

The clip member 222 is positioned so that the ends of legs 226 enter loops 224. As clip member 222 is moved so that more and more of the legs 226 enter loops 224, crossbar 228 encounters camming surface 234 of baseplate 220. This camming surface or ramp 234 provides for increased ease in installing the legs 226 in loops 224. Finally, as the legs 226 enter loops 224 to the maximum extent, crossbar 228 passes beyond camming surface 234, as shown in FIG. 17, and is situated in close proximity to flat surface 236. With crossbar 228 in this position, downwardly extending surface 238 acts as a stop to prevent the legs 226 of clip member 222 from decoupling from loops 224. Stop 238 can be manually overcome when it is desired to remove baseplate 220 from posterior housing 124. Baseplate 220 includes a series of projections 240 which are positioned to reduce the amount of movement of the legs 226 in loops 224, thereby providing for more stable attachment of the posterior housing 124 to the baseplate 220. The bracket and loops 224 in cooperation with the clip member 222 secure the posterior housing 124 to the baseplate 220 in a low profile, space saving design without requiring that holes be made in the posterior housing.

The pump 110 can be produced to be corrosion resistant, for example, by the use of non-metallic components. In particular, components of the stator assembly 139, components of housing 112 and impeller 134 can be produced using polymeric materials.

While this invention has been described with respect to various specific examples and embodiments, it is to be understood that the invention is not limited thereto and that it can be variously practiced within the scope of the following claims.

What is claimed is:

1. A pump comprising:
   a pump casing having an inlet and an outlet;
   an impeller having an impeller plate, a rotary axis and a maximum cross-sectional area of said impeller plate perpendicular to said rotary axis and being rotatably mounted within said pump casing for rotation about said rotary axis, said impeller being configured and positioned relative to said pump casing so that the rotation of said impeller is effective to urge fluid from said inlet to flow through said outlet;
   a rotor coupled to said impeller plate and rotatable with said impeller, and including a plurality of permanent magnetic poles arranged in a generally flat array, and said rotor having a maximum magnetic cross-sectional area perpendicular to said rotary axis which is larger than the maximum cross-sectional area perpendicular to said rotary axis of said impeller plate; and
   a stator spaced apart from and generally facing said generally flat array and a plurality of magnetic windings positioned on said stator and adapted to effect rotation of said rotor and said impeller upon energization thereof.

2. The pump of claim 1 wherein said rotor has said maximum magnetic cross-sectional area perpendicular to said rotary axis which is at least about 125% the maximum cross-sectional area perpendicular to said rotary axis of said impeller plate.

3. The pump of claim 1 wherein said rotor includes a region extending away from said stator which has the magnetic properties of a soft magnetic material.

4. The pump of claim 1 wherein said rotor comprises a ring magnet including said plurality of permanent magnetic poles.

5. The pump of claim 4 wherein said rotor further comprises soft magnetic material positioned so that said magnet is positioned between said stator and said soft magnetic material.

6. The pump of claim 1 wherein said rotor is completely encapsulated in a polymeric material.

7. The pump of claim 1 which further comprises a bulkhead fastened to said pump casing and positioned between said rotor and said stator, said bulkhead including a bulkhead sheet and a centrally located mounting feature; a stationary axle located partially in or on said mounting feature and extending outwardly away from said stator across said bulkhead sheet; and a bearing rotatably mounted on said axle and adapted to rotate with said rotor and said impeller.

8. The pump of claim 7 which further comprises a stationary thrust bearing adjacent said bearing and located in or on said mounting feature.

9. The pump of claim 7 which further comprises a fluid passageway providing fluid communication between said inlet and an inner surface of said bearing facing said axle.

10. The pump of claim 9 wherein said bearing includes at least one fluid pathway between said inner surface of said bearing and said axle.

11. The pump of claim 1 which further comprises electrically insulating material located between said stator and said magnetic windings.

12. A pump comprising:
   a pump casing having an inlet and an outlet;
   an impeller having a rotary axis and being rotatably mounted within said pump casing for rotation about said rotary axis, said impeller being configured and positioned relative to said pump casing so that the rotation of said impeller is effective to urge fluid from said inlet to flow through said outlet;
   a rotor removably coupled to and rotatable with said impeller, and including a magnet having a plurality of permanent magnetic poles, said plurality of permanent magnetic poles being arranged in a generally flat array, said rotor being completely encapsulated in polymeric material; and
   a stator spaced apart from and generally facing said generally flat array and a plurality of magnetic windings positioned on said stator and adapted to effect rotation of said rotor and said impeller upon energization thereof.

13. The pump of claim 12 wherein said rotor includes a region extending away from said stator which has the magnetic properties of a soft magnetic material.

14. The pump of claim 12 wherein said rotor further comprises soft magnetic material positioned so that said magnet is positioned between said stator and said soft magnetic material.

15. The pump of claim 12 which further comprises a bulkhead fastened to said pump casing and including a bulkhead sheet located in a space between said rotor and said stator, and a centrally located mounting feature; a stationary axle located partially in or on said mounting feature and extending outwardly away from said stator across said bulkhead sheet; and a bearing rotatably mounted on said axle and adapted to rotate with said rotor and said impeller.

16. The pump of claim 15 which further comprises a stationary thrust bearing adjacent said bearing and located in or on said mounting feature.

17. The pump of claim 15 which further comprises a fluid passageway providing fluid communication between said inlet and an inner surface of said bearing facing said axle.

18. The pump of claim 17 wherein said bearing includes at least one fluid pathway between said inner surface of said bearing and said axle.

19. The pump of claim 12 which further comprises electrically insulating material located between said stator and said magnetic windings.

20. A pump comprising:
   a pump casing having an inlet and an outlet;
   an impeller having a rotary axis and being rotatably mounted within said pump casing for rotation about said rotary axis, said impeller being configured and positioned relative to said pump casing so that the rotation of said impeller being effective to urge fluid from said inlet to flow through said outlet;
   a rotor coupled to and rotatable with said impeller, and including a plurality of permanent magnetic poles which are arranged in a generally flat array;

a stator spaced apart from and generally facing said generally flat array and a plurality of magnetic windings positioned on said stator and adapted to effect rotation of said rotor and said impeller upon energization thereof;

a bulkhead fastened to said pump casing and including a bulkhead sheet located in a space between said rotor and said stator so as to seal said rotor from said stator and further including a centrally located mounting feature;

a stationary axle located partially in or on said mounting feature and extending outwardly across said bulkhead sheet away from said stator, said axle including a region coupled to said pump casing; and a bearing rotatably mounted on said axle and adapted to rotate with said rotor and said impeller.

21. The pump of claim 20 wherein said axle has a tubular configuration.

22. The pump of claim 20 wherein said axle includes an end region which extends across said bulkhead and is coupled to said pump casing.

23. The pump of claim 20 wherein at least one of said mounting feature and said axle is structured to prevent said axle from rotating.

24. The pump of claim 20 which further comprises a stationary thrust bearing adjacent said bearing and located in or on said mounting feature.

25. The pump of claim 20 wherein said bearing includes at least one fluid pathway between said inner surface of said bearing and said axle.

26. The pump of claim 20 which further comprises electrically insulating material located between said stator and said magnetic windings.

27. The pump of claim 20 wherein the bulkhead sheet has a thickness in a range of about 0.001 inches to about 0.1 inches.

28. A pump comprising:

a pump casing having an inlet and an outlet;

an impeller having a rotary axis and being rotatably mounted within said pump casing for rotation about said rotary axis, said impeller being configured and positioned relative to said pump casing so that the rotation of said impeller is effective to urge fluid from said inlet to flow through said outlet;

a rotor coupled to and rotatable with said impeller, and including a plurality of permanent magnetic poles arranged in a generally flat array;

a stator spaced apart from and generally facing said generally flat array and a plurality of magnetic windings positioned on said stator and adapted to effect rotation of said rotor and said impeller upon energization thereof; and a bulkhead fastened to said pump casing and including a bulkhead sheet located in a space between said rotor and said stator, the bulkhead sheet has one or more regions in contact with and structurally supported by said stator.

29. The pump of claim 28 wherein said bulkhead is made of a material having a low magnetic permeability and a high co-efficient of thermal conductivity.

30. The pump of claim 28 wherein said region or regions of said bulkhead are located directly between said rotor and said stator.

31. The pump of claim 28 wherein said bulkhead includes a centrally located mounting feature, and said pump further comprises a stationary axle located partially in or on said mounting feature and extending outwardly across said bulkhead; and a bearing rotatably mounted on said axle and adapted to rotate with said rotor and said impeller.

32. The pump of claim 28 wherein the bulkhead sheet has a thickness in a range of about 0.001 inches to about 0.1 inches.

33. A pump comprising:

a pump casing having an inlet and an outlet;

an impeller having a rotary axis and being rotatably mounted within said pump casing for rotation about said rotary axis, said impeller being configured and positioned relative to said pump casing so that the rotation of said impeller is effective to urge fluid from said inlet to flow through said outlet;

a rotor coupled to and rotatable with said impeller, and including a plurality of permanent magnetic poles arranged in a generally flat array;

a stator spaced apart from and generally facing said generally flat array and a plurality of magnetic windings positioned on said stator and adapted to effect rotation of said rotor and said impeller upon energization thereof;

a housing coupled to said pump casing, having an inner sidewall and defining a space in which said stator is located; and a heatsink member located in said space and including a first element which extends across at least a portion of said space and a second element coupled to said first element and being in contact with said inner sidewall of said housing to effectively dissipate heat generated by said stator out of said housing.

34. The pump of claim 33 wherein said first element includes substantially opposing first and second ends, said second element is coupled to said first element at said first end and said heatsink member further comprises a third element coupled to said first element at said second end and being in contact with said inner sidewall of said housing.

35. The pump of claim 33 which further comprises an electronics assembly coupled to said plurality of magnetic windings and effective in controlling the operation of said pump, at least a portion of said electronics assembly being secured to said first element.

36. The pump of claim 35 wherein said heatsink member further includes a plurality of clips located on said first element and adapted to secure at least a portion of said electronics assembly to said first element.

37. The pump of claim 33 wherein said second element is sized and sufficiently resilient to effectively bias the second element for contact with the inner sidewall of the housing.

38. The pump of claim 33 wherein said second element defines an outer wall and the major amount of said outer wall is in contact with said inner sidewall of the housing.

39. The pump of claim 33 wherein said heatsink member is made of a material having a thermal conductivity equal to or greater than the thermal conductivity of aluminum.

* * * * *